United States Patent [19]
Clark

[11] 4,098,470
[45] Jul. 4, 1978

[54] MOVIE REEL SYSTEM

[76] Inventor: Dexter C. Clark, 1091 Franquette Ave., San Jose, Calif. 95125

[21] Appl. No.: 784,426

[22] Filed: Apr. 4, 1977

[51] Int. Cl.² ............... B65H 17/48; G03B 1/02
[52] U.S. Cl. ............................................. 242/55.18
[58] Field of Search ............... 242/55.18, 71.8, 74, 242/74.2, 55.17, 55.16, 179; 352/124, 128

[56] References Cited
U.S. PATENT DOCUMENTS

| | | | |
|---|---|---|---|
| 2,670,202 | 2/1954 | Gregg | 242/55.18 |
| 2,766,947 | 10/1956 | Hultgren | 242/71.8 |
| 2,974,892 | 3/1961 | Geloso | 242/71.8 |
| 3,104,848 | 9/1963 | Joffe | 242/71.8 |
| 3,393,790 | 7/1968 | Dixon | 242/71.8 X |
| 3,993,260 | 11/1976 | Bauer, Sr. | 242/55.18 |

Primary Examiner—George F. Mautz
Attorney, Agent, or Firm—Gerald L. Moore

[57] ABSTRACT

A center unwinding reel assembly including first and second reel members which are combined to form a takeup assembly on which the film or tape can be wound. After the film is wound these members are separated with the wound film remaining on the first member, and a third member is fixed to the first member to form a payout assembly enabling the unwinding of the film from the center thereby doing away with the need to rewind the film after each use. In addition provision is made for partially rewinding the film on the payout assembly so the film can be run backwards.

10 Claims, 8 Drawing Figures

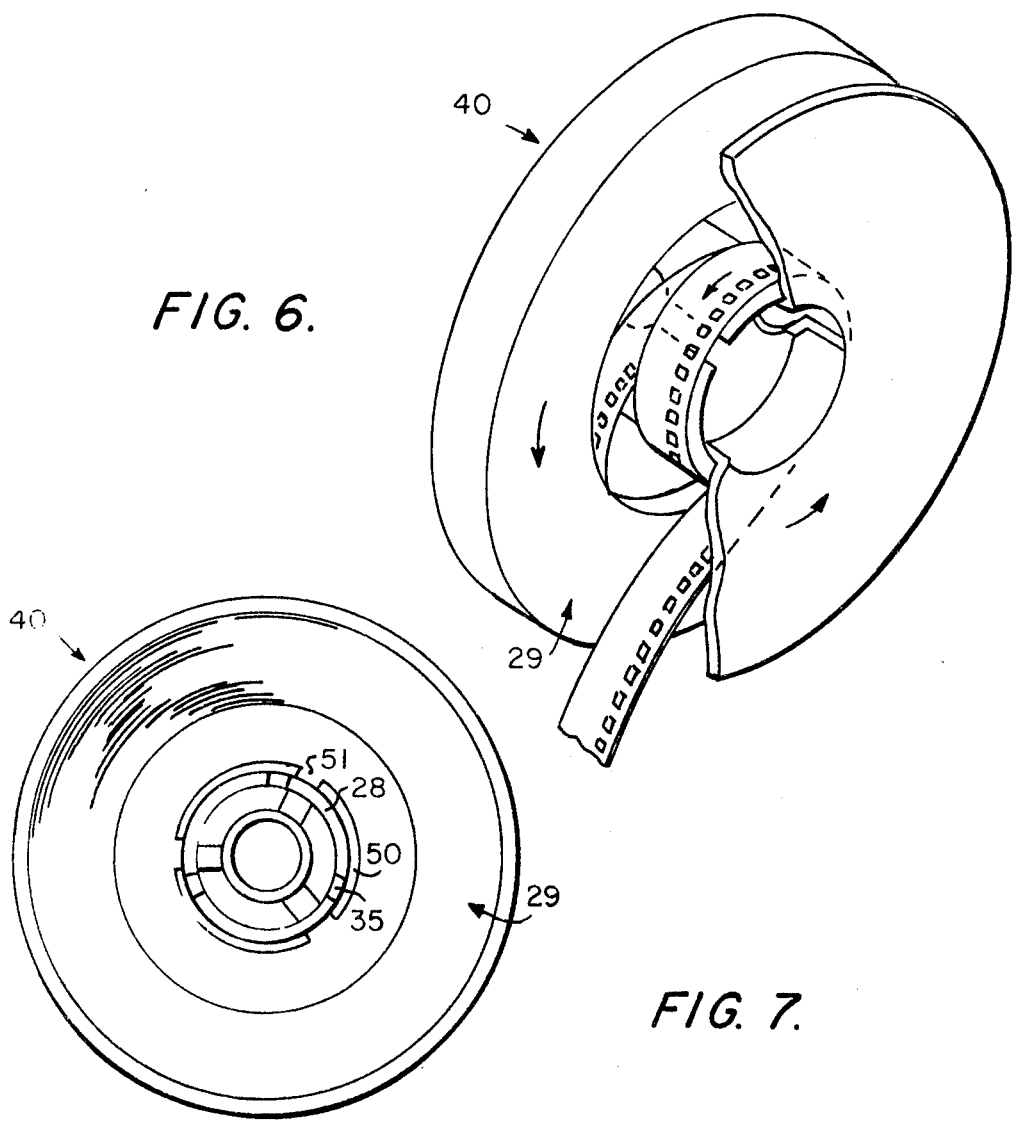
FIG. 6.
FIG. 7.
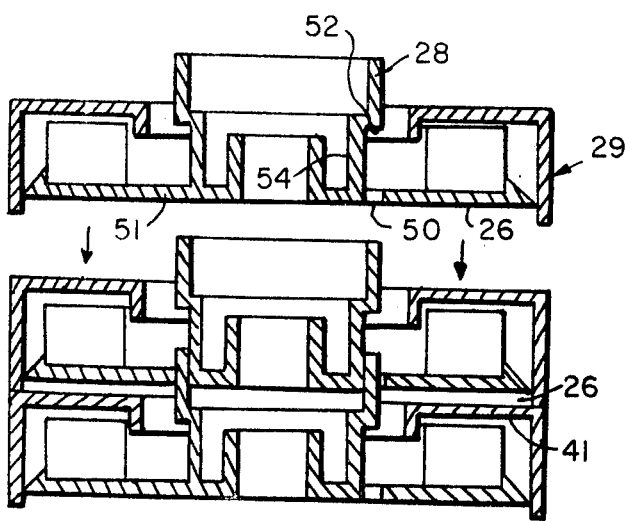
FIG. 8.

MOVIE REEL SYSTEM

BACKGROUND OF THE INVENTION

In reel systems, and especially in those utilized in movie projectors, the film is unwound from one reel, passed through the projecting mechanism and wound onto another reel. The film on the second reel, however, has the starting end underneath thereby necessitating the rewinding of the film onto another reel prior to the next usage.

To do away with the need for rewinding, various schemes have been developed to allow the unwinding of the film from the center. One such system, for instance, is shown in U.S. Pat. No. 1,276,054, issued on Aug. 20, 1918, with Mr. C. G. Grabe as inventor and entitled: Moving Picture Machine. Another such center unwinding mechanism is disclosed in U.S. Pat. 3,601,329, issued on Aug. 24, 1971, and entitled: Center Unwinding Mechanism, with Arthur Hagstrom et al, as inventors. However such reel systems are sufficiently complicated in design to possibly make them difficult to handle.

It is the purpose of the present invention to provide a center unwinding reel assembly which is simple in design and inexpensive to manufacture.

SUMMARY OF THE INVENTION

A reel assembly comprising a first member with a hub for mounting on the supporting shaft of a movie projector or like apparatus and having a planar sidewall fixed to one end of the hub and extending normal to the axis thereof. A second member includes a planar sidewall and means for attachment to the first member hub to form a takeup assembly on which the film can be wrapped between the spaced sidewalls. After the reel is wrapped on the takeup assembly, the second member is removed from the hub leaving the film, and there is attached a third member having a sidewall for holding the film on the first member to form a payout assembly. The sidewall on the third member includes an opening at the center allowing access to and unwinding of the film from the center. In addition, a fourth attachable member is provided to allow partial rewinding into the payout assembly as is necessary when the film is run backwards through the projection.

DESCRIPTION OF THE DRAWINGS

FIG. 6 shows the reel partially cut away and in the rewind mode;

FIG. 7 is a side plan view of the reel of FIG. 6 reduced slightly in size; and

FIG. 8 shows the manner of stacking the reels for storage and handling.

DESCRIPTION OF THE INVENTION

Figure 1:
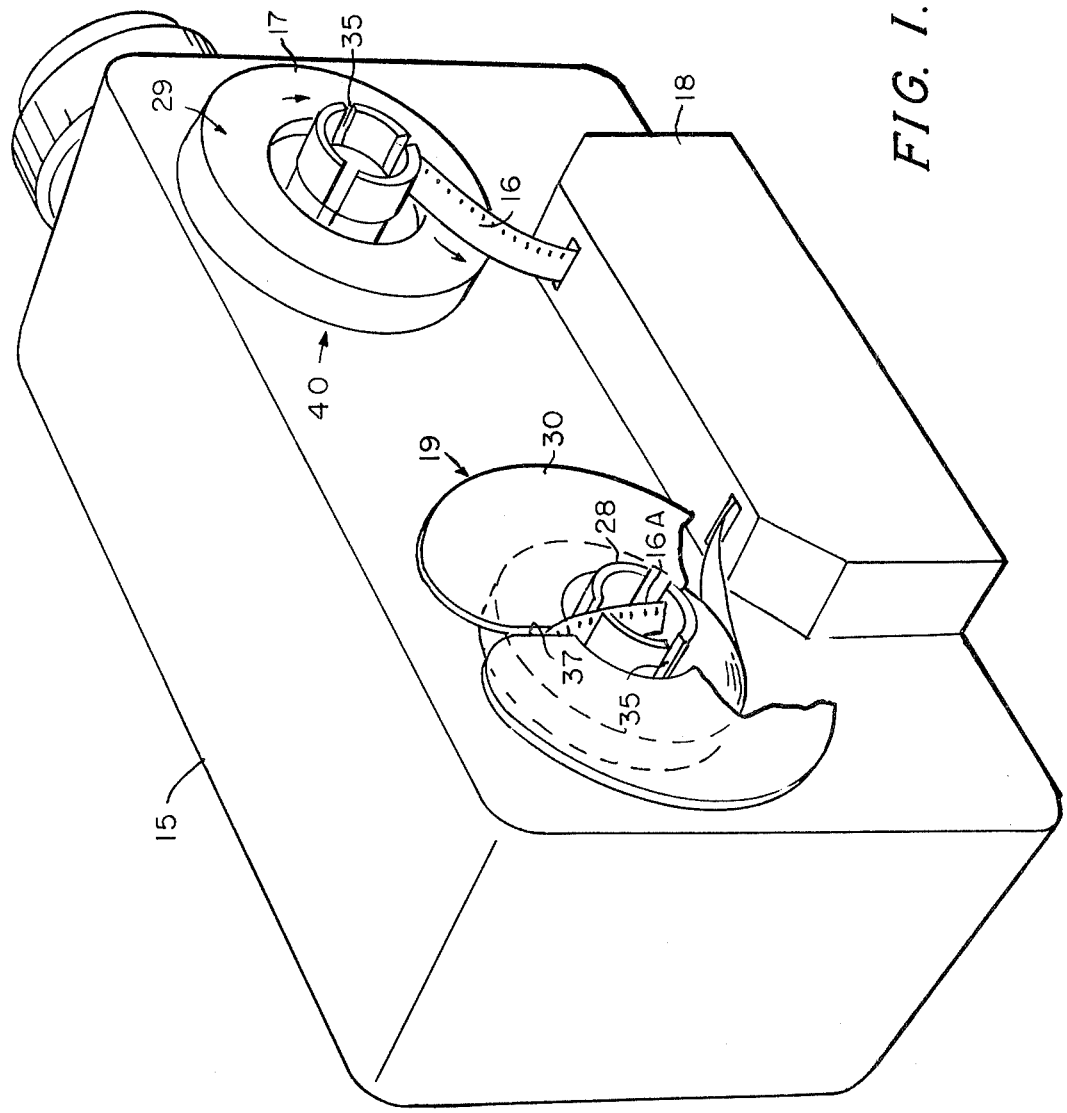
FIG. 1 is a perspective view of film payout and takeup assemblies of the subject invention mounted on a movie projector.

Shown in FIG. 1 is a movie projector 15 for projecting the images included on a movie film 16. The film is unwound from the payout reel 17, passed through the drive mechanism 18 and received on the takeup reel 19 in the standard manner. The purpose for the present invention is to enable the use of such tapes as the movie film shown in FIG. 1, or such other tapes as recording tapes, without rewinding.

Figure 2:
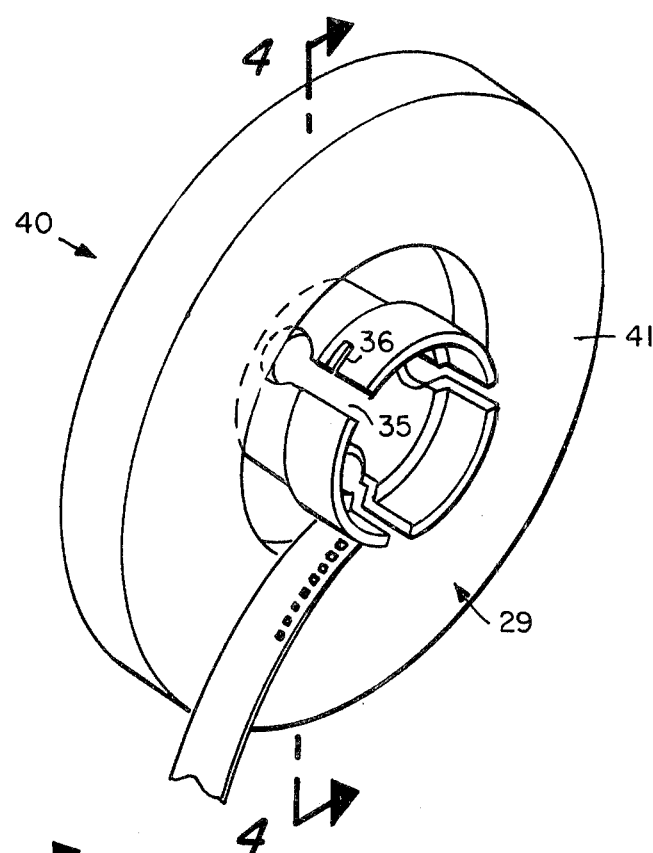
FIG. 2 is an enlarged view of the film payout assembly.
Figure 3:
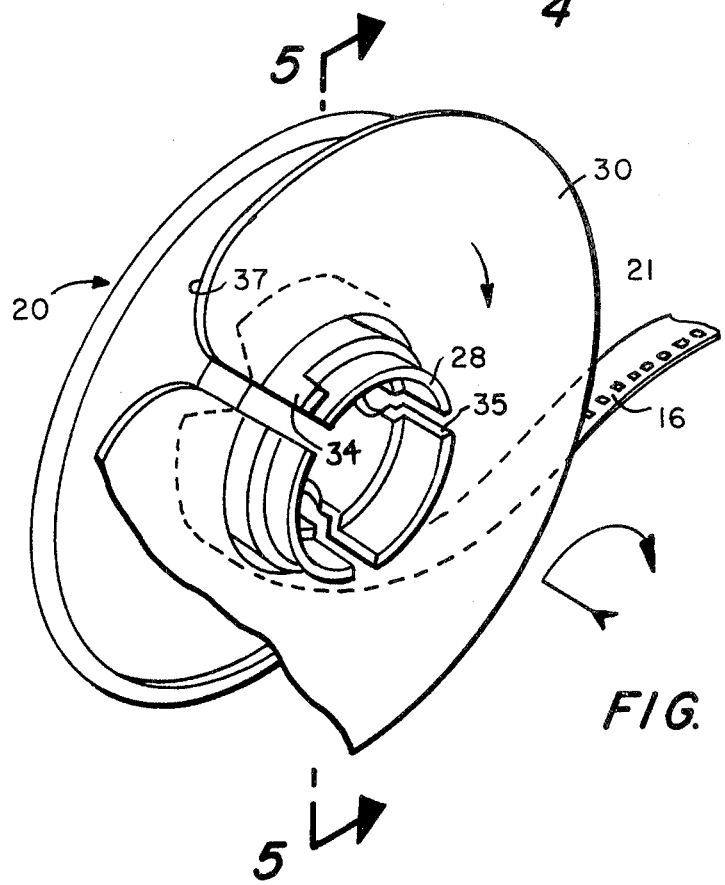
FIG. 3 is an enlarged view of the film takeup assembly.
Figure 5:
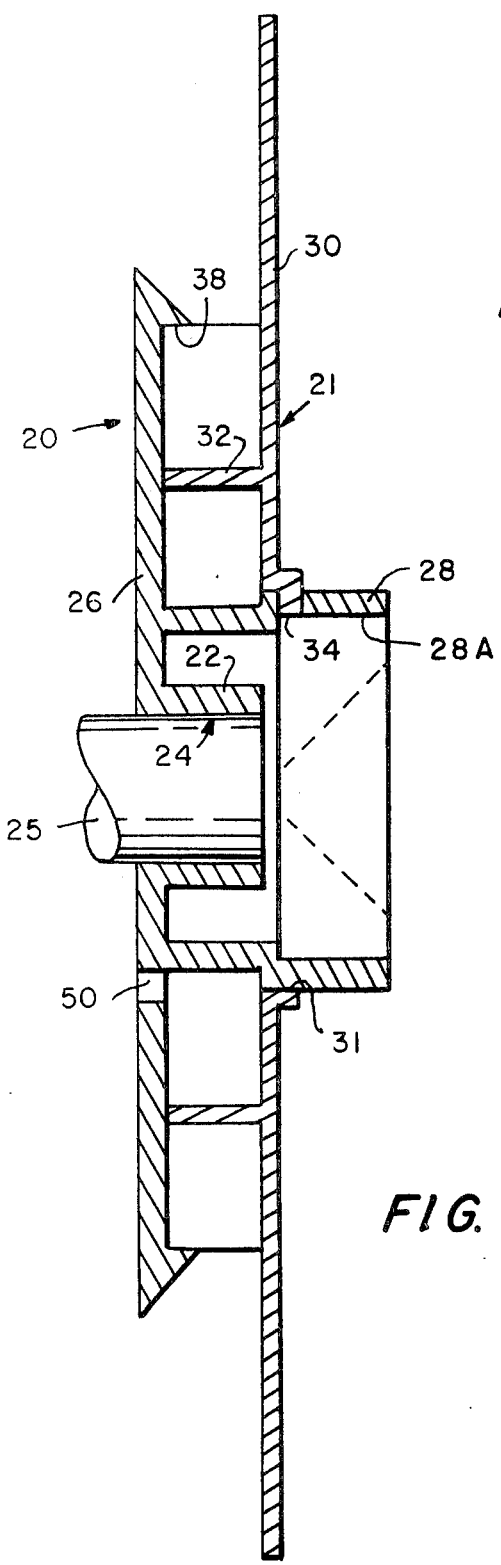
FIG. 5 is a cross-sectional view of the reel assembly of FIG. 3 along the line 5—5.

In accordance with the present invention, there is shown in FIG. 3 a film takeup assembly 19 comprising a first member 20 to which is attached a second member 21 and on which the film 16 can be wound. As shown also in FIG. 5, the first member comprises a hub 22 having an axially extending center opening 24 for receiving a shaft 25 fixed to the movie projector. A first planar sidewall 26 is fixed to one end of the hub, i.e. the end adjacent the movie projector, and extends radially outward from the hub. Fixed to the first planar sidewall is a cylindrical support member 28 forming a part of the hub and positioned outside of and concentric to the hub 22 and extending axially from the sidewall 26. This first member serves to support either a second member 21 to form the film takeup assembly 19 or to support a third member 29 (FIG. 2) to form a film payout assembly 40 to be explained later.

The film takeup assembly 19 comprises the combination of the first member 20 and the second member 21. The second member 21 comprises a planar second sidewall 30 having an axially extending center opening 31 sized to fit over the outside diameter of the extending end of the support member 28. Extending normal to the sidewall 30 are a plurality of arcuate projections 32 which form the base on which the film is wound. In the embodiment shown there are four such segments which together form a cylindrical base for the film.

For attachment of the second member to the first member a plurality of lugs 34 extend radially inward and overlap the support member 28 of the hub on the first member. The support member includes a plurality of slots 35 (FIG. 7) extending axially and in a position of alignment with the lugs. Thus to place the second member on the first member, lugs are aligned with the first member slots and the second member is fitted over the support member 28 thereof until the extensions 32 abut the sidewall 26. At this time the second member is rotated slightly about the axis of the first member to shift the lugs 34 into the adjacent side-extending slots 36 (see FIGS. 2 and 3) to lock the two members together. Because of the sliding fit between the support member and the center opening in the sidewall 30, the members fit snugly together to form the takeup reel assembly. Thus film can be wound around the extensions 32 of this takeup reel assembly between the spaced sidewalls 26 and 30.

To facilitate initiation of the winding operation the sidewall 30 includes a slot 37 connecting with the center opening 31. For purposes of convenience and safety, the slot edges are rounded off at the outer ends. Because of the particular position of the slot 37 and its alignment with the lugs 34, this slot also communicates with the slots 35 in the hub. Thus the film end 16A can be threaded into the takeup reel assembly by merely aligning the film axially with the assembly and placing the end (see FIG. 1) within the center of the support member 28 and sliding the film edgewise through the aligned slots 35 and 37 so that winding can be initiated as shown in FIG. 1. In this manner the takeup reel assembly is formed of the first and second members for placement onto the takeup shaft 25 of the projector to receive the film after it has passed through the projecting assembly. As the film is wound it is partially held in place by a lip 38 on the wall member 26 extending towards the sidewall 30. The film will slide between this lip and the wall member 30 but will be thereafter hindered from unwinding.

Once the film is passed through the projector and the trailing end is wound on the takeup reel assembly 19, the assembly can be removed from the projector for preparation for unwinding as would be necessary if the film were to be passed through the projector again. To do so the first member 20 and the second member 21 are separated leaving the film on the first member. During this procedure it is necessary to hold the assembly with the sidewalls extending horizontal and the first member on the bottom. The second member can thereafter be grasped and rotated slightly to shift the lugs 34 from the slots 36 and into the slots 35. Subsequent axial movement of the second member moves the lugs 34 along the slots 35 to separate the second member from the first member while leaving the film roll on the first member. Any tendency of the film to unwind at this time will be opposed by a concentric lip 38 on the first member. Of course the film tends to remain in the original configuration so far as removal of the inner support 32 because of the normal film tendency to straighten or move to a curvature of greater radius.

Figure 4:
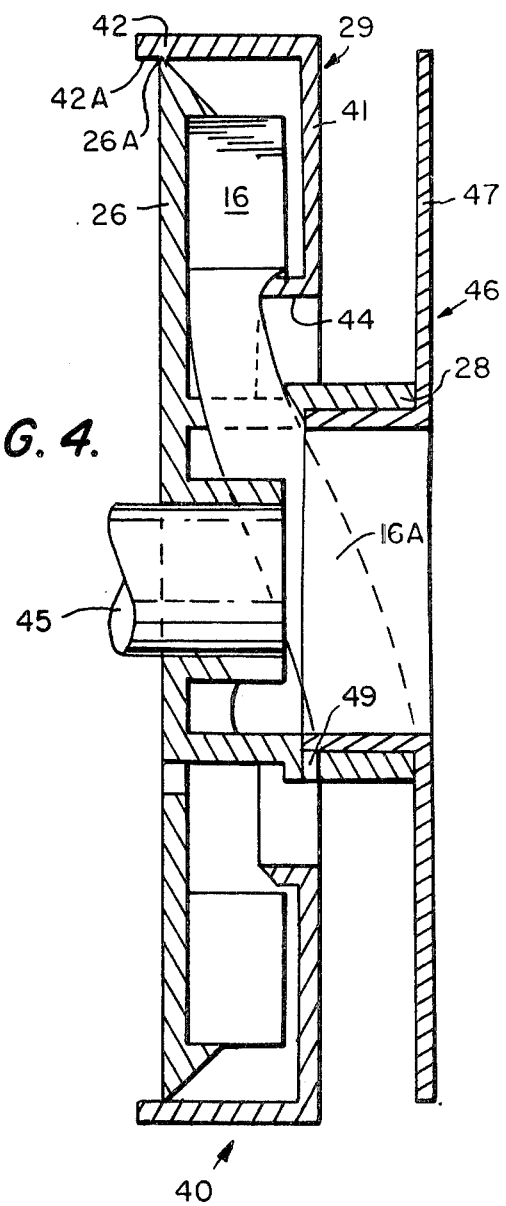
FIG. 4 is a cross-sectional view of the reel assembly of FIG. 2 along the line 4—4.

With the first member held with the film positioned thereon, a third member 29 is fitted onto the first member to form a takeoff reel assembly 40 as shown primarily in FIGS. 2 and 4. The third member 29 comprises a sidewall 41 having an outer radius just exceeding the outer radius of the sidewall 26 of the first member. Attached to the outer edge of the sidewall 41 is a cylindrical end wall 42. This end wall includes an axially extending inner surface 42A (FIG. 4) having a diameter of sufficient size to fit over the end 26A of the sidewall 26 of the first member. A friction fit is sufficient to hold the third member and the first member together in the position shown in FIG. 2.

At the inner edge the sidewall 41 terminates at a radius approximately equal to the radius of the segments 32 of the second member and has attached thereto a lip 44 extending axially towards the first member for approximately one-third the distance between the sidewalls of the payout assembly. Thus the film 16 is held between the outer wall 42 and this inner lip 44 for storage, et cetera. The end 16A of the film extends through the slot 35 of the support member 28.

For unwinding the tape as would occur if the film were to be viewed by use of the projector 15, the payout assembly 40 is placed on the shaft 45 (FIG. 4) of the projector by alignment of the hub center opening 24 with the shaft and pressing the assembly onto the shaft. With the payout reel so positioned the end 16A of the film is accessible within the center opening of the support member 28. Grasping and rolling the film end 16 will cause the film to rotate slightly as it is moved between the lip 44 and the sidewall 26. However passage of the film therebetween is relatively simple and friction-free to enable unwinding of the film from the center as the payout assembly rotates. Thus it can be seen that there is provided a film reel device comprising three members with the first and second members being joined to form a takeup reel assembly and the first and third members being joined to form a payout reel assembly. The third member also serves to protect the film during storage. Only one of the second members is necessary for a film library since the only time this member is used is during the takeup operation and this member is thereafter removed and replaced by the third member for storage or subsequent use of the film.

In accordance with another feature of the invention there is provided a reverse takeup reel member 46 to permit rewinding on the payout assembly 40 as would occur if it were desired to momentarily run the film backwards through the projector. Accordingly as shown in FIG. 4 there is provided the fourth member 46 comprising a sidewall 47 having an outer diameter approximately equal to that of the first member sidewall 26. This sidewall terminates at an inside diameter slightly less than the inside diameter of the support membe 28 and has attached thereto an axially extending cylindrically shaped support member 48 having an outer diameter sized to snuggly fit within the hub member 28. Thus with the payout assembly 40 assembled, this takeup member can be added without hindering in any manner the unwinding of the film 16. However if it is desired to reverse the direction of the film, the film is wound around the support member 28 and held in that position between the payout assembly sidewall 41 and the sidewall 47 of this fourth member. The fourth member can be locked in position by one or more lugs 49 which slide axially within the slots 35 of the first member and thereafter when shifted into the adjacent slots 36 interlock the first and fourth members in the same manner as does the second member. Of course this fourth member need not be used except when it is desired to run the film in reverse after payout has been initiated from the payout assembly. After the momentary reversal, the film can be unwound from the reverse takeup assembly as needed.

In accordance with another feature of the invention the payout assemblies are constructed to interlock together for storage purposes. For this purpose and as shown primarily in FIGS. 7 and 8 there are located slots 50 in the sidewall 26 of the first member following a radius slightly larger than the radius of the hub member 28 leaving the support member 28 joined with the sidewall member 26 by a plurality of radially extending spokes 51 in the manner shown in FIG. 7. The slots 50 are sufficiently large to receive the spokes 51 of the hub member 28. In addition the support member 28 is offset slightly by a radially extending lip 52 to permit passage of the member 28 over the section 54 of the support member adjacent the sidewall 26. Thus as shown in FIG. 8 the payout assemblies are stacked together by inserting each support member 28 of a payout assembly 40 through the end wall 26 of the adjacent payout assembly by alignment of the support member sections with the slots 50. After the assemblies have been interfit until the sidewall 41 and the adjacent sidewall 26 abut, it will be found that the side extending slots 36 in the support member align with the spokes 51 of the adjacent support member. Thereafter by relative rotation of the adjacent payout assemblies, the spokes 51 of one are shifted into the slots 36 of the other to lock the payout assemblies together. Thus there is provided a means for conveniently stacking the payout assemblies for storage or carrying purposes. In addition identification labels can be placed on the third member 41 to identify the film wound thereon.

The invention claimed:

1. A reel device for holding a film and adapted to fit on a supporting shaft, said reel device comprising, in combination:
   a first member having a hub forming a center opening to receive the shaft and having fixed to one end a first planar sidewall;
   a second member having a second planar sidewall forming a center opening sized to fit over the hub and including means for attachment thereto with the second sidewall being in spaced relationship with the first sidewall such that the film can be wound therebetween and adjacent the first sidewall;
   a third member having an outer wall including means for attachment to the first member sidewall and also having a third sidewall member attached in a position extending parallel to but spaced from the first sidewall when the first and third members are attached so as to enclose and hold in place the film wound adjacent the first sidewall on the center hub whereby the film can be wound on the combination of the first and second members and thereafter by removal of the second member from the first member leaving the film on the first member, the third member can be attached to the first member to enclose the film on the first member.

2. A reel device as defined in claim 1 wherein said second member includes a center cylindrical portion having a diameter greater than the diameter of the first member hub and on which film can be wound.

3. A reel device as defined in claim 2 wherein said third member sidewall includes a center opening positioned concentric with the first member hub when the first and third members are attached to allow unwinding of the film from the center through said third member sidewall opening.

4. A reel device as defined in claim 3 wherein said first member hub includes a center opening for receiving the end of the film to be wound thereon.

5. A reel device as defined in claim 4 wherein said second member sidewall includes a slot communicating with said first member hub center opening to facilitate threading of the film end therein.

6. A reel device as defined in claim 3 including a fourth member having a center support for attachment to the first member and a fourth sidewall member such that when the third member and the first member are attached and the fourth member is attached to the first member, film can be rewound thereon.

7. A reel device as defined in claim 1 wherein said first sidewall includes a lip thereon positioned adjacent the outer edge and extending towards the second member when the first and second members are attached to hold the tape on the first member when the second member is removed therefrom.

8. A reel device for holding a film and adapted to fit on a supporting shaft, said reel device comprising, in combination:
   a first member having a hub forming a center opening to receive the shaft and having fixed to one end a first planar sidewall;
   a second member including a second planar sidewall adapted to fit over the hub and including means for attachment thereto in a position with the second sidewall in axial spaced relationship with the first sidewall such that the film can be wound therebetween on the hub and adjacent the first sidewall;
   said second planar sidewall including a slot therein communicating with the hub center opening to facilitate threading of the film end therein for attachment of the film to the first member to facilitate winding of the film between the first and second sidewalls;
   said second member including a projection thereon forming a cylindrical member having a diameter greater than the hub of the first member and extending towards the first member when the first and second members are attached and onto which the film can be wound;
   said first member including a lip formed on the outer edge of said first sidewall in a position extending parallel to the hub and towards the second member when the second member is attached to the first member to hinder unwinding of the tape from the first member; and
   a third member having a third planar sidewall with means thereon for attachment to the first member sidewall at the outer periphery thereof after removal therefrom of the second member and including a center opening concentric with the hub of the first member when the first and third members are attached through which film on the first member can be unwound from the center.

9. A reel device as defined in claim 8 including a fourth member having a fourth sidewall and including a center portion for attachment to said first member whereby when the third member is fixed to the first member for unwinding film therefrom and the fourth member is attached to the first member film can be rewound onto the first member.

10. A reel device as defined in claim 8 wherein each said first member includes members for interlocking with other first members for allowing interlocking of the first members for storage.

* * * * *